Figure 1:
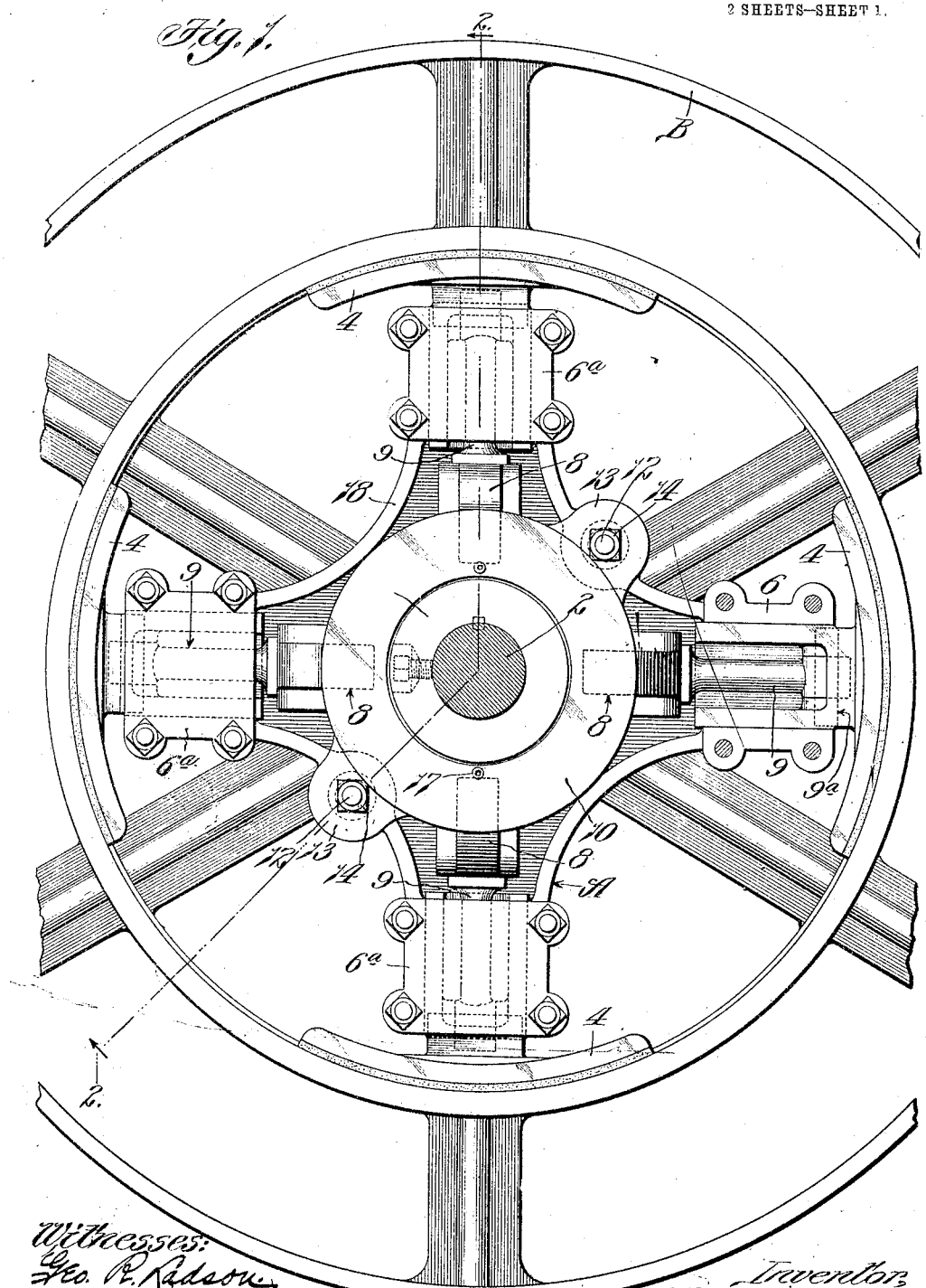

H. A. HOLZER.
FRICTION CLUTCH PULLEY.
APPLICATION FILED JULY 16, 1912.

1,058,974.

Patented Apr. 15, 1913.

2 SHEETS—SHEET 1.

Witnesses:
Geo. R. Radson
C. M. Badger

Inventor
H. A. Holzer
By Bakewell & Cornwall Attys.

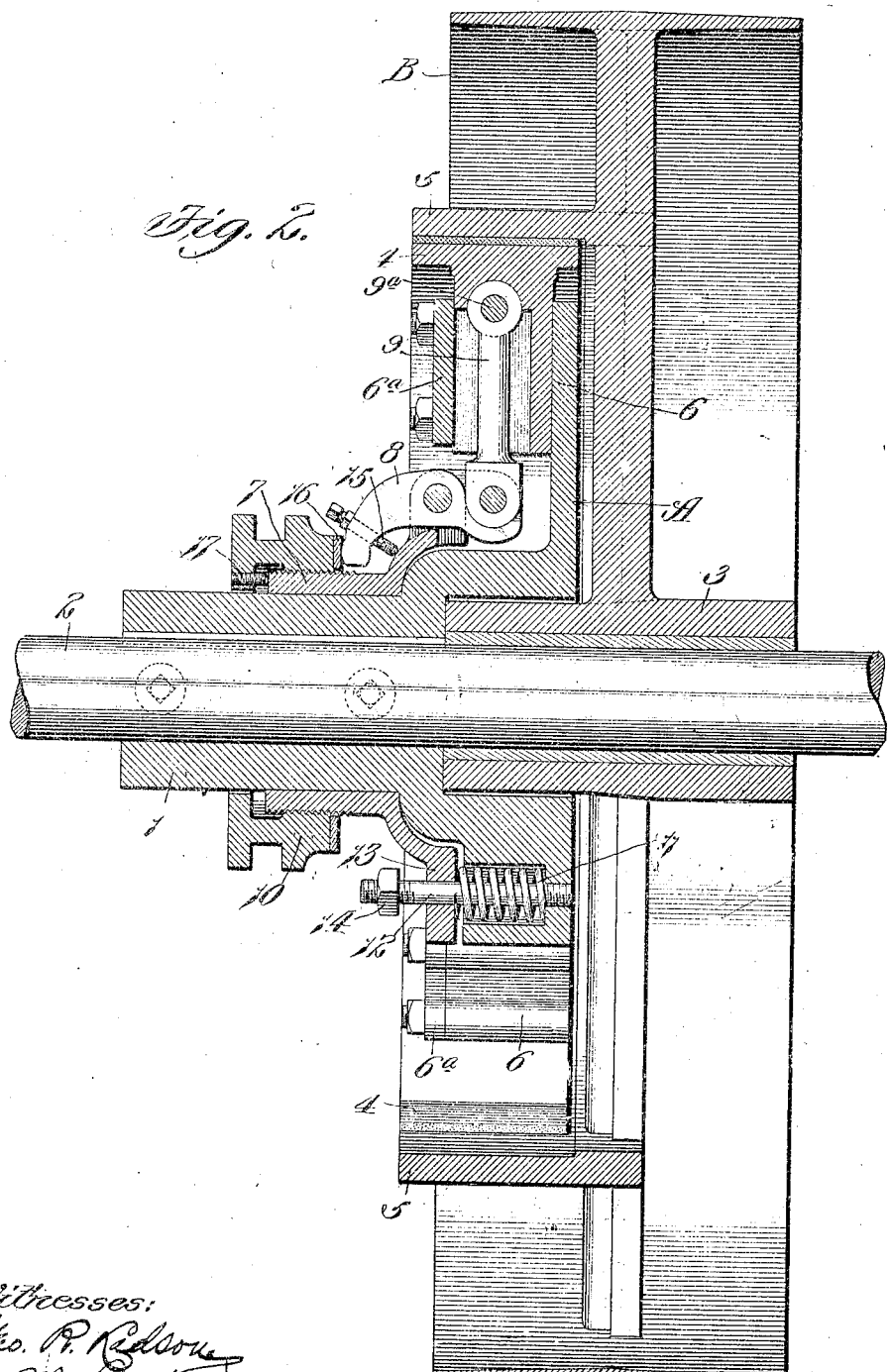

UNITED STATES PATENT OFFICE.

HIRAM A. HOLZER, OF PITTSBURG, KANSAS, ASSIGNOR TO UNITED IRON WORKS COMPANY, OF SPRINGFIELD, MISSOURI, A CORPORATION OF MISSOURI.

FRICTION-CLUTCH PULLEY.

1,058,974. Specification of Letters Patent. Patented Apr. 15, 1913.

Application filed July 16, 1912. Serial No. 709,647.

*To all whom it may concern:*

Be it known that I, HIRAM A. HOLZER, a citizen of the United States, residing at Pittsburg, Kansas, have invented a certain new and useful Improvement in Friction-Clutch Pulleys, of which the following is a full, clear, and exact description, such as will enable others skilled in the art to which it appertains to make and use the same.

This invention relates to friction clutches of the type in which the driving member is provided with a plurality of radially moving shoes or devices that are forced into and out of engagement with the driven member of the clutch.

The main object of my invention is to provide a clutch of the type mentioned which is so designed that all of the gripping shoes on the driving member can be adjusted simultaneously, thus insuring an accurate adjustment of the coöperating friction surfaces of the clutch and preventing a greater degree of frictional engagement at one point than at another.

Another object is to provide a friction clutch of novel design which is so constructed that the gripping shoes on the driving member will not drag on the driven member when the clutch is thrown out. And still another object is to provide a strong and serviceable clutch of simple design that can be manufactured at a low cost.

Other objects and desirable features of my invention will be hereinafter pointed out.

Figure 1 of the drawings is a front elevational view of a clutch constructed in accordance with my invention; and Fig. 2 is a longitudinal sectional view of the clutch.

Referring to the drawings which illustrate the preferred form of my invention, A designates the spider of the driving member of the clutch which is provided with a hub 1 which is securely connected to the driving shaft 2 in any suitable manner, and B designates the driven member of the clutch herein shown as a pulley provided with a symmetrical hub 3 that is loosely mounted on the driving shaft 2. The driving member is provided with a plurality of gripping shoes or devices 4 that are moved radially into and out of engagement with a laterally projecting annular flange or friction ring 5 on one side of the driven member B, said gripping shoes being moved outwardly into engagement with the flange 5 by a manually-operated means under control of the operator, and in the opposite direction out of engagement with said flange by said manually-operated means or by springs or other suitable resilient devices in case said manually-operated means fails to withdraw the gripping shoes from said flange. The gripping shoes 4 are slidingly mounted in housings or guideways 6 on the spider A of the driven member, each of said housings comprising a detachable cover or cap plate 6$^a$. The means herein shown for actuating the gripping shoes 4 consists of a sleeve 7 slidingly mounted on the hub 1 of the spider A of the driving member, adjustable toggle levers 8 carried by the sleeve 7, and toggle links 9 pivotally connected to the inner ends of the levers 8 and to the gripping shoes 4, a lever 8 and link 9 being provided for each gripping shoe 4. Each of the links 9 is pivotally connected at 9$^a$ to the outer end portion of the gripping shoe with which it coöperates, and said shoe is provided with an elongated slot, as shown in Fig. 2, so as to provide a clearance for the link 9 and thus permit it to swing on the pivot pin 9$^a$ as a fulcrum when the sleeve 7 is moved longitudinally of the hub 1 on which it is slidingly mounted. The sleeve 7 is moved to the right, looking at Fig. 2, so as to force the gripping shoes 4 outwardly into engagement with the friction flange 5 on the driven member by a manually-operated device, not shown, that coöperates with a collar 10 on the sleeve 9, and said sleeve is moved in the opposite direction or to the left so as to withdraw the gripping shoes 4 from engagement with the flange 5 by said manually-operated device, or by means of coiled expansion springs 11 which are seated in pockets formed in the spider A of the driving member. Means is provided for guiding and limiting the outward movement of the sleeve 7, namely, the movement of said sleeve in the direction to withdraw the gripping shoes from engagement with the driven member of the clutch, and in the preferred form of my invention as herein shown, said means consists of guides or studs 12 on the spider A that project laterally through openings in ears 13 on the sleeve 7 and which are provided with nuts or other suitable adjustable devices 14 that coöperate with the ears 13 to limit the outward movement of the sleeve 7.

In order to adjust the gripping shoes 4 accurately I have designed the clutch in such a manner that all of the gripping shoes will be adjusted simultaneously and the same degree when it is desired to change the adjustment of the clutch. I accomplish this by providing the driving member with an adjustable part that bears against the levers 8 forming part of the toggle connections between the gripping shoes 4 and the sleeve 7 so as to vary the position of said levers. The adjustable part of the clutch herein shown consists of the collar 10 previously mentioned which is provided with internal screw-threads that coöperate with external screw-threads on the sleeve 7, thereby enabling said collar to be adjusted longitudinally of the sleeve 7 so as to move the levers 8 on their fulcrum and thus change the position of the gripping shoes 4 with relation to the sleeve 7. Stop screws 15 are adjustably mounted in the outer ends of the levers 8 so as to limit the movement of said levers in one direction and thus cause them to remain stationary with respect to the sleeve 7 after the adjusting collar 10 has been moved into engagement with the outer ends of the levers 8, as shown in Fig. 2. If desired, a washer 16 may be arranged between the adjusting collar 10 and the outer ends of the levers 8, and means may be provided for locking the collar 10 in adjusted position, the means herein shown consisting of one or more set screws 17 mounted in said collar and adapted to engage the outer end of the sleeve 7, as shown in Fig. 2. The stop screws 15 not only limit the inward movement of the outer ends of the toggle levers 8 when the collar 10 is adjusted inwardly, but said stop screws also insure a positive withdrawal of the gripping shoes from engagement with the friction flange 5 on the driven member of the clutch, thereby preventing the gripping shoes from dragging on said friction flange when the clutch is thrown out. In order to reinforce and strengthen the housings 6 on which the gripping shoes 4 are slidingly mounted, the spider A of the driving member of the clutch is provided with laterally projecting flanges 18 that merge into the side walls of said housings and thus rigidly connect all of the housings together, as shown clearly in Fig. 1.

One desirable feature of a friction clutch pulley of the construction above-described is that all of the gripping shoes bear with equal pressure on the friction flange of the driven member owing to the fact that said shoes move in unison or simultaneously when the collar 10 is adjusted. And another desirable feature of such a pulley is that all of the gripping shoes can be adjusted quickly and accurately by manipulating only one part, namely, the collar 10. There is no liability of the gripping shoes dragging on the friction flange of the driven member when the clutch is thrown out because the springs 11 are of sufficient tension to force the sleeve 7 outwardly as soon as the operator throws or releases the actuating device, not shown, that shifts said sleeve and the stop screws 15 in the toggle levers 8 prevent said levers from remaining at rest when the sleeve 7 moves outwardly.

In addition to the above desirable features my improved clutch pulley is strong and serviceable, it comprises only a few parts of simple construction that are not apt to get out of order, and it can be manufactured cheaply.

Having thus described my invention, what I claim as new and desire to secure by Letters Patent is:

1. A friction clutch comprising a driving member provided with a cylindrical-shaped hub, a driven member, gripping shoes carried by one of said members for coöperating with the other member, a reciprocating actuating element slidingly mounted on the hub of the member which carries said gripping shoes, toggle levers pivotally mounted on said hub and pivotally connected by means of links to said shoes, and an adjusting device on said actuating element that coöperates with said toggle levers so as to effect the adjustment of all of said gripping shoes simultaneously.

2. A friction clutch pulley comprising a driving member provided with closed guideways, a driven member, radially moving shoes slidingly mounted in the guideways in said driving member, a cylindrical hub on said driving member, a movable actuating element reciprocatingly mounted on said hub, toggles comprising levers pivotally mounted on said hub and links that connect said levers to said gripping shoes, an adjusting device on said actuating element that coöperates with said toggle levers to move same in one direction and thus effect a simultaneous adjustment of all of the gripping shoes, and adjustable stops in said levers that bear against said actuating element and thus determine the degree of movement which said adjusting device imparts to said levers.

3. A friction clutch pulley comprising a driving member, a driven member, radially moving shoes slidingly mounted in said driving member, an actuating sleeve slidingly mounted on a hub on said driving member, toggle levers pivotally connected to said sleeve, links that join said levers to said gripping shoes, a rotatable collar mounted on said sleeve and arranged to engage said toggle levers and move them so as to move all of the levers simultaneously with respect to said sleeve and thus vary the position of said gripping shoes, adjustable means for determining the degree of adjustment of said toggle levers by said collar and for holding said levers stationary with respect to said sleeve, and resilient means for actuating said sleeve so as to withdraw said gripping shoes from engagement with the driven member.

4. A friction clutch pulley comprising a driving member, a driven member, radially moving shoes on said driving member for coöperating with said driven member, a movable actuating element, toggle levers for connecting said actuating element and gripping shoes together, means for adjusting all of said toggle levers simultaneously so as to vary the frictional engagement of said shoes on the driven member, resilient means interposed between said actuating element and said driving member for moving said actuating element in a direction to withdraw said gripping shoes from engagement with said driven member, guides on said driving member that pass through said actuating element, and means on said guides for limiting the movement of said actuating member when it is acted upon by said resilient means.

5. A friction clutch pulley comprising a loosely mounted pulley provided with an annular friction flange, a driving member having a hub that is securely connected to a driving shaft, radially moving gripping shoes on said driving member, a closed housing on said driving member in which said shoes are slidingly mounted, a movable actuating sleeve mounted on the hub of said driving member, toggle levers pivotally mounted on said sleeve, links pivotally connected to said gripping shoes and to said levers and arranged in slots in said sleeves, and an adjusting collar rotatably mounted on said sleeve and arranged to engage said toggle levers so as to effect a simultaneous adjustment of all of the gripping shoes.

6. A friction clutch pulley comprising a loosely mounted pulley provided with an annular friction flange, a driving member having a hub that is securely connected to a driving shaft, radially moving gripping shoes slidingly mounted in housings in said driving member, a movable actuating sleeve mounted on the hub of said driving member, toggle levers pivotally mounted on said sleeve, links that connect said levers to said gripping shoes, an adjusting collar mounted on said sleeve and arranged to engage said toggle levers so as to effect a simultaneous adjustment of all of the gripping shoes, expansion springs interposed between said sleeve and driving member, stops on said driving member for limiting the movement of said sleeve with relation to said member, adjustable devices on said toggle levers that coöperate with said adjusting collar to hold said levers stationary with respect to said sleeve, and means for locking said collar in adjusted position.

7. A friction clutch pulley comprising a pulley having a symmetrical hub that is loosely mounted on a driving shaft, a ring-shaped flange projecting laterally from said pulley, a spider arranged inside of said flange and having a hub that is rigidly connected to said driving shaft, radially moving gripping shoes slidingly mounted in guideways in said spider, removable members forming part of said guideways for retaining said shoes in position, an actuating sleeve slidingly mounted on the hub of said spider, toggle levers pivotally connected to said sleeve and provided with adjustable stops that strike against the sleeve, links pivotally connected to the inner ends of said levers and to said gripping shoes, and an adjustable member on said sleeve that coöperates with said toggle levers to effect the simultaneous adjustment of all of said gripping shoes, and means for locking said adjustable member in the position to which it has been moved.

In testimony whereof I hereunto affix my signature in the presence of two witnesses, this 9th day of July, 1912.

HIRAM A. HOLZER.

Witnesses:
 ORA FRITZ,
 GEO. H. STUESSI.